Figure 1:
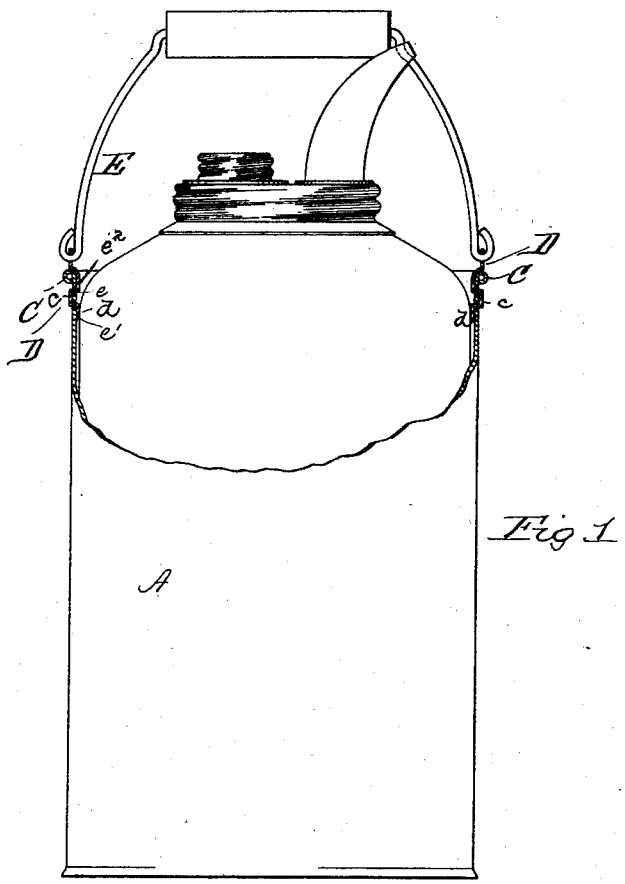

(No Model.)

W. GRANGE.
BAIL EAR.

No. 371,136. Patented Oct. 4, 1887.

Witnesses
Will he Powell
J.B. McGirr

Wm Grange
Inventor
by Connolly Bros
Attorneys

UNITED STATES PATENT OFFICE.

WILLIAM GRANGE, OF PHILADELPHIA, PENNSYLVANIA.

BAIL-EAR.

SPECIFICATION forming part of Letters Patent No. 371,136, dated October 4, 1887.

Application filed June 2, 1887. Serial No. 240,078. (No model.)

*To all whom it may concern:*

Be it known that I, WILLIAM GRANGE, a citizen of the United States, residing at Philadelphia, in the county of Philadelphia and State of Pennsylvania, have invented certain new and useful Improvements in Bail-Ears for Oil-Can Casings and other Vessels; and I do hereby declare the following to be a full, clear, and exact description of the invention, reference being had to the accompanying drawings, which form part of this specification.

This invention has relation to metal casings for glass oil-holding vessels, and has for its object the provision of a novel form of bail-ear and of a novel means for attaching the ear to the casing. The low price at which metal-incased oil-vessels are sold necessitates the strictest economy in manufacture, but does not obviate the requirements of strength and durability; hence considerable skill and ingenuity are required in producing vessels which shall fulfill every reasonable demand and yet add but little to the market price of the oil itself when the oil and can are sold together. The bail-ear, to be in keeping with the demands of economy, lightness, and compactness, is generally made by stamping it out of tin and passing the shank through a slot in the upper part of the casing. It is customary to form the shank with a wide base and a narrow neck and to so bend and arrange the ear that after passing the eye part through the slot from the inside the base is held flat against the inner surface of the casing by impact or pressure of the glass vessel alone. This is obviously a very insecure, primitive, and awkward means for securing such a device as a bail-ear, which is subjected to considerable strain. The ear under such conditions is liable to be pulled out of place, being only supported on one side by the wall of the glass vessel, and to be bent and generally disarranged. The eye part, being bent up outside the casing, is not braced in any way, and hence becomes twisted and ruptured and sometimes torn off. Again, in order to bring the parts into proper relation, the slot in the wall of the can is necessarily wider than the neck of the ear, so that when the latter is in place it has no stability. As the holding of the ear depends solely on the pressure or impact of the glass vessel, the withdrawal of the vessel from the casing necessarily deprives the ear of its support and allows it to slip out of its slot, thus preventing the casing from being used for any other purpose. Again, unless the glass vessel is fitted very nicely to the casing and is of uniform surface, it will barely hold the ear at all, but will not prevent the latter from being loose, shaky, and generally insecure. Finally, when the ear, as in the case alluded to, projects beyond the outer surface of the casing, it greatly interferes with the close packing of the vessels for transportation, as it will prevent the vessels from being placed side by side in close contact.

My invention is designed to obviate the defects in the ears and means for fastening hitherto used; and it consists in the novel construction and arrangement of ear, hereinafter described and claimed.

Figure 3:
Figure 2:
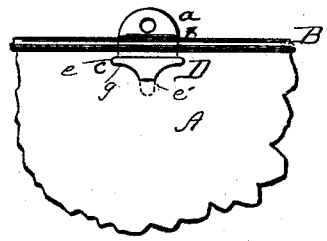
Figure 4:

In the drawings, Figure 1 is a side view, partly in section, of a metal-incased oil-holder, the casing being partly in section, to show the position of the ears. Fig. 2 is an external view of a part of the casing with ear attached. Figs. 3 and 4 are perspective views of the ear.

A designates the can or vessel, made of glass, and B the cylindrical metal casing, made of sheet metal—that is, tinned sheet-iron. Around the upper edge of the case is the usual wired bead, C.

D D designate the ears, and E the bail or handle. The ear itself consists of a piece of tinned iron stamped out to form the blank, which embraces the eye $a$, parallel-sided shank or neck $b$, widened body $c$, and narrow stem or tongue $d$. To receive and hold the ear, two slots are cut in the wall of the casing a short distance from each other and below the bead. The slit $e$ is of the width of the shank or neck $b$, and the slit $e'$ of the width of the tongue, or of just sufficient width to allow these parts to pass through.

To fit and fasten an ear in place, the blank being struck up in the process of stamping, so as to have the recess $e^2$, the eye part of the blank is passed through the slit $e$ from the outside until the shoulders or wings $g$ $g$ of the body part $c$ touch the casing. At the same time, or while the eye part is being inserted, the tongue enters its slit $e$. The eye is now brought up over and caused to rest on and be supported by the bead, while the tongue projects inwardly from the inner surface of the casing. Now, all that is required in order to fasten the ear rigidly is to thrust the glass vessel into the casing, which operation bends down the tongue and clinches it upon and against the inner surface of the casing. When so clinched and fastened, the ear is a permanent fixture, and will remain firmly in position after the glass vessel is withdrawn, thus permitting the casing to be conveniently used as a bucket. As will be seen, the ear is in close contact and abutment with the casing on both sides and is secured by the bending and interlocking of the parts, so that it does not in any way depend on the impact of the glass vessel for security.

The ear cannot be twisted or torn out by any reasonable usage, and is strong, stable, and durable, requiring no solder, rivets, or other like fastenings to keep it in place. The support obtained by the beads and the shouldered parts of the ear prevent the ear from being displaced by any downward thrust or pressure, while the wings $g\,g$ prevent the ear from being pulled out of place or disarranged by any upward strain. As seen, the ear has a double hold on the casing or a purchase on the edges of both slots, thus distributing the strain and correspondingly increasing the resisting property of the ear.

Having described my invention, what I claim, and desire to secure by Letters Patent, is—

1. The combination, with the casing or sheet-metal vessel B, having the horizontal slits $e\,e'$, of the sheet-metal bail-ear D, comprising the eye $a$, stem or neck $b$, winged part $c$, and tongue $d$, substantially as described.

2. As a new article of manufacture, a sheet-metal bail-ear, comprising the eye $a$, neck or stem $b$, winged body portion $c$, and elongated tongue $d$, substantially as described.

In testimony that I claim the foregoing I have hereunto set my hand this 30th day of April, 1887.

WILLIAM GRANGE.

Witnesses:
   THOS. A. CONNOLLY,
   WILL H. POWELL.